United States Patent [19]

Wallentowitz et al.

[11] Patent Number: 4,794,539
[45] Date of Patent: Dec. 27, 1988

[54] PROPULSION CONTROL USING STEERING ANGLE AND VEHICLE SPEED TO DETERMINE TOLERANCE RANGE

[75] Inventors: Henning Wallentowitz, Buch am Erlbach; Siegfried Neundorf; Wolfgang Kuhn, both of Stuttgart; Karl-Heinz Büchle, Sachsenheim; Karl-Eugen Laubacher, Stuttgart, all of Fed. Rep. of Germany

[73] Assignee: Daimler-Benz Aktiengesellschaft, Stuttgart, Fed. Rep. of Germany

[21] Appl. No.: 942,692

[22] Filed: Dec. 22, 1986

[30] Foreign Application Priority Data

Dec. 21, 1985 [DE] Fed. Rep. of Germany ....... 3545715

[51] Int. Cl.$^4$ ............................................. B60T 8/58
[52] U.S. Cl. .................. 364/426.01; 303/100
[58] Field of Search .................. 364/426, 431.07; 180/197; 361/238; 303/95, 97, 100

[56] References Cited

U.S. PATENT DOCUMENTS

| | | | |
|---|---|---|---|
| 3,910,647 | 10/1975 | Takeuchi | 180/197 |
| 4,036,536 | 7/1977 | Quon | 303/97 |
| 4,042,059 | 8/1977 | Bertolasi | 303/100 |
| 4,484,280 | 11/1984 | Brugger et al. | 364/426 |
| 4,511,014 | 4/1985 | Makita | 180/197 |
| 4,657,313 | 4/1987 | Fennel et al. | 303/100 |

Primary Examiner—Gary Chin
Attorney, Agent, or Firm—Barnes & Thornburg

[57] ABSTRACT

A propulsion control system for motor vehicles for maintaining stable driving conditions, having a computer unit for determining a desired value or a tolerance range for the rotational speed difference of the front wheels or of the lateral acceleration or of the yaw velocity, and having a comparator unit in which this desired value or tolerance range is compared with the measured actual value, in which case the difference between the actual value of the desired value or tolerance range is used as a control signal for the brakes of the wheels and/or for a power control element of the vehicle engine.

12 Claims, 1 Drawing Sheet

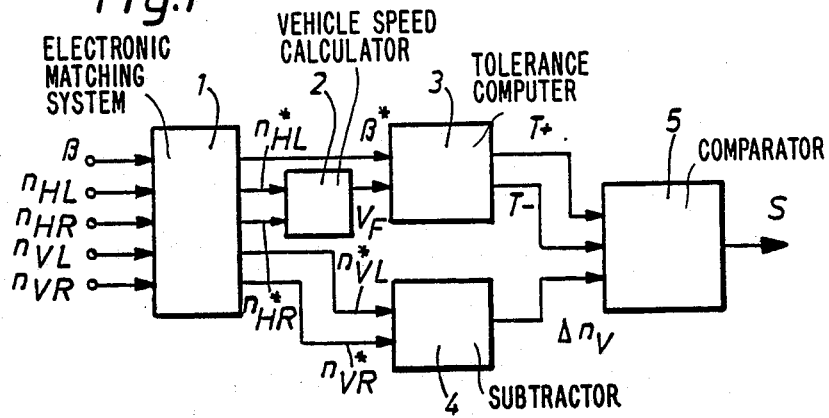
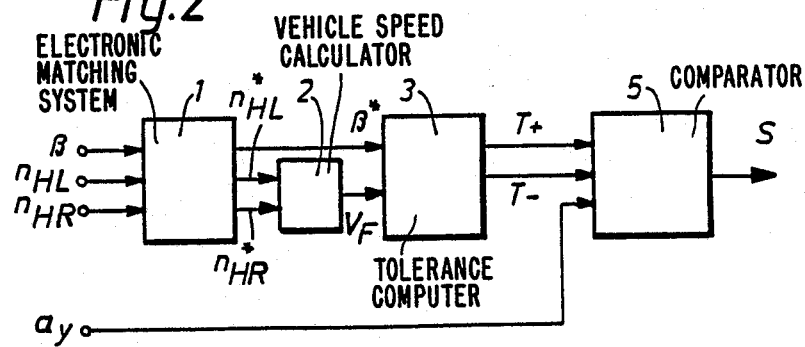

PROPULSION CONTROL USING STEERING ANGLE AND VEHICLE SPEED TO DETERMINE TOLERANCE RANGE

BACKGROUND AND SUMMARY OF THE INVENTION

The invention relates to a propulsion control system for motor vehicles for maintaining stable driving conditions.

This type of system, shown in DE-PS No. 19 02 944, is a control device for avoiding swerving in turns in the case of motor vehicles. A plurality of measured and calculated quantities are obtained from a gyroscope and several sensors, and provided, in a way that is not shown, control signals for the brake system as well as a power control element of the internal-combustion engine. In this case, three programs for different road conditions are provided that have to be selected by the driver.

This type of system is not satisfactory with respect to manufacturing technology because it is much too costly, nor with respect to the application. It can be anticipated what would happen should the driver forget to select the program assigned to the actual road conditions.

For stabilizing a vehicle that enters the limiting range with respect to driving dynamics, the shifting from a single-axle to a multi-axle drive is known. Wheel slip control systems (ASR) and antilocking brake systems (ABS) are also known. However, all these systems cannot keep a vehicle in all cases from exceeding the limits of driving dynamics.

It is the objective of the invention to achieve this goal in a better way and with means that are simpler than the known means and to provide a system that can keep a vehicle from exceeding stable road conditions and from being damaged or destroyed as a result.

For rear wheel drive vehicles, the speed difference of the front wheels is compared to the tolerance range. According to the invention, this objective can be achieved by the following. From the measured quantities of steering angle and driving speed, a value or a tolerance range around the value of the speed difference of the front wheels or of the lateral acceleration or of the yaw velocity is calculated according to known formulas and is compared with the measured value of these quantities. The result of the comparison, i.e., the amount by which the measured value exceeds the calculated value or is outside the tolerance range, is the measurement for the intervention into the braking system or the power control element of the internal-combustion engine.

For rear wheel drive vehicles, the speed difference of the front wheel is compared to the tolerance range. For vehicles with all-wheel drive, if a wheel slip control system is operative at the same time, the difference of the front wheel speeds supplies no practically usable signals. However, this type of vehicle concept can be stabilized by using instead the lateral acceleration or the yaw velocity.

The advantage of the system according to the invention, in comparison to the known system, is that by means of a few, easily obtainable input quantities, a control of the vehicle can be achieved with respect to driving stability.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram of a control system according to the present invention using the speed difference, and FIG. 2 is a block diagram of a control according to the present invention using the lateral acceleration or the yaw velocity.

DETAILED DESCRIPTION OF THE DRAWINGS

FIG. 1 is a block diagram of a system for stabilizing a vehicle. The basis is a vehicle with one or two driven axles and a steered front axle, in which case no wheel slip control system is to act on the front axle. From sensors that are known per se and are not shown, the speeds $n_{HL}$; $n_{HR}$; $n_{VL}$; $n_{VR}$ of the left and the right rear wheel, of the left and the right front wheel and the steering angles $\beta$ are fed as input signals to an adaptive electronic matching system 1. The electronic matching system adjusts all wheel speed signals to the same magnitude and the steering angle signal to 0° when the vehicle is driving straight-ahead and in the case of different tire diameters. The adjusted signals and the other parameters required for determining the desired value that are adjusted in the stable range of the roll steer effect of the motor vehicle, but are not shown in the drawing, form the output signals of the electronic matching system 1 and are marked by an asterisk.

In the case of this embodiment, the vehicle speed $V_F$ in the system 2 is obtained from the rear wheel speeds corresponding to the formula:

$$\frac{VF}{1} = \frac{n_{HL}{}^* + n_{HR}{}^*}{2}$$

in a known way.

The steering angle signal $\beta^*$ and the driving speed signal $V_F$ are fed to a computer unit 3, which calculates the desired value for the speed difference $\Delta n_v$ of the front wheels from these two quantities by means of a known formula describing the driving dynamics of the vehicle.

On the other hand, the signals $n_{VL}{}^*$ and $n_{VR}{}^*$ of the measured front wheel speeds are fed to a measuring unit 4 that determines the difference of these two speeds and makes it available as an actual value at its output.

Assuming the formula used to calculate the speed difference corresponds exactly to the actual conditions, the calculated desired value and the measured actual value of said speed difference should correspond to one another. Since this, however, is not the case in practice, the present system provides a tolerance range $T-$ to $T+$ instead of the calculated value for the speed difference. No control of the engine torque or no intervention into the brakes is to take place when the actual value is within the tolerance range. The tolerance limits values are narrowed with increasing driving speed and increasing steering angle by means of indicated factors or curves in the calculation in the computer unit 3 according to the formula without having to use additional input quantities.

The tolerance limit values $T+$ and $T-$ of the front wheel speed difference from the computer unit 3, and the actual front wheel speed difference $\Delta n_v$ from the measuring unit 4 are fed to the comparator unit 5 which determines if the actual speed difference is outside the tolerance limits and by how much it is outside the tolerance limits. A control signal S that appears at the output of the compactor 5 increase as the actual value exceeds or falls below the desired tolerance range. Thus compactor 5 is a window comparator. This control signal S acts on the brake system of the vehicle or on the power control element that affects the engine torque so that the speed of the vehicle and its propulsive force are reduced in order not to go beyond the stable driving condition.

As already mentioned, this type of control cannot be used when a wheel slip control system affects the driven wheels of the front axle because then the signal of the rotational speed difference cannot be used.

In this case, the control can be carried out if, instead of the rotational speed difference of the front wheels, the lateral acceleration or the yaw velocity are utilized, as shown in diagram form in FIG. 2. In this case, the driving speed, as shown in the example according to FIG. 1, is derived from the rotational speeds of the rear wheels. However, it may also be determined by means of a separate speed sensor.

From known sensors that are not shown, the rotational speeds $n_{HL}$ and $n_{HR}$ of the left and the right rear wheel and the steering angle $\beta$, are fed as input signals, to the adaptive electronic matching system 1 described for FIG. 1. The driving speed is obtained from the adjusted rear wheel speeds in the system 2 as described for FIG. 1. The steering angle signal $\beta^*$ and the driving speed signal $V_F$ are fed to a computer unit 3, which by means of an also known formula, computes the desired value for the lateral acceleration or the yaw velocity of the vehicle. As previously described, tolerance limit values T+ and T− are thereby calculated and are fed to a comparator unit 5 to be compared with an actual value from a lateral acceleration sensor or a yaw velocity sensor. As previously mentioned, the comparator unit 5 forms a control signal S that increases as the actual value exceeds the upper limit value T+ or falls below the lower limit value T−. The control signal S affects the brake system of the vehicle or the power control element influencing the engine torque. The measured lateral acceleration or yaw velocity may also be provided to computer unit 3 to vary the tolerance range.

It should be noted that the tolerance range may be a single desired value and thus the comparator 5 would provide a proportional control signal S for all deviations from the single desired value.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a propulsion control system for a motor vehicle for maintaining stable driving conditions, having sensor means for determining the speed of the vehicle wheels, having means for determining the vehicle speed, having means for determining the steering angle and having processing means for producing control signals for the brakes of the wheels and for a power control element of an engine of the vehicle from output signals of the sensor means and the vehicle speed and steering angle determining means the improvement being said processing means which comprises:
    computer means for generating, from the steering angle and the vehicle speed, a tolerance range for the difference of the rotational speeds of the front wheels as an output signal,
    measuring means for generating, from the rotational speed signals of the front wheels, the actual value of the difference of the rotational speeds of the front wheels as an output signal, and
    a comparator means for comparing the output signals of the computer means and the measuring means and generating said control signals.

2. A system according to claim 1, wherein the comparator means generates said control signals proportional to the amount by which the output of the measuring means is outside the tolerance range.

3. A system according to claim 1, including an adaptively operating electronic matching means connected to inputs of said vehicle speed determining means and said computer means for adjusting inputted parameters required for determining the tolerance range in the stable range of the roll steer effect of the vehicle.

4. A system according to claim 1, wherein said computer means generates said tolerance range narrower with increasing vehicle speed and increasing steering angle.

5. In a propulsion control system for a motor vehicle for maintaining stable driving conditions, having means for determining the vehicle speed, having means for determining the steering angle, having means for determining the lateral acceleration and having processing means for producing control signals for the brakes of the wheels and for a power control element of an engine of the vehicle from output signals of the vehicle speed, steering angle and lateral acceleration determining means, the improvement being said processing means which comprises:
    a computer means for generating, from the steering angle and the vehicle speed, tolerance range of lateral acceleration as an output signal, and
    a comparator means for comparing the output signals of the computer means and of the determining means of the lateral acceleration and generating said control signals.

6. A system according to claim 5, wherein the comparator means generates said control signals proportional to the amount by which the output of the determining means of said lateral acceleration is outside the tolerance range.

7. A system according to claim 5, including an adaptively operating electronic matching means connected to the inputs of said vehicle speed determining means and said computer means for adjusting inputted parameters required for determining the tolerance range in the stable range of the roll steer effect of the vehicle.

8. A system according to claim 5, wherein said computer means varies the tolerance range as a function of the measured lateral acceleration.

9. In a propulsion control system for a motor vehicle for maintaining stable driving conditions, having means for determining the vehicle speed, having means for determining the steering angle, having means for determining the yaw velocity and having processing means for producing control signals for the brakes of the wheels and for a power control element of an engine of the vehicle from output signals of the vehicle speed, steering angle and yaw velocity determining means, the improvement being said processing means which comprises:
- a computer means for generating from the steering angle and the vehicle speed, a tolerance range of the yaw velocity as an output signal, and
- a comparator means for comparing the output signals of the computer means and the determining means of the yaw velocity and generating said control signals.

10. A system according to claim 9, wherein the comparator means generates said control signals proportional to the amount by which the output of the determining means of the yaw velocity is outside the tolerance range.

11. A system according to claim 9, including an adaptively operating electronic matching means connected to inputs of said vehicle speed determining means and said computer means for adjusting inputted parameters required for determining the tolerance range in the stable range of the roll steer effect of the vehicle.

12. A system according to claim 9, wherein said computer means varies the tolerance range as a function of the measured yaw velocity.

* * * * *